W. GRUS, Jr.
LEAF SPRING LUBRICATOR.
APPLICATION FILED AUG. 8, 1913.

1,121,354.
Patented Dec. 15, 1914.

Witnesses:
Geo. G. Davison
Herbert Palmer

Inventor.
William Grus Jr.
By Brown, Hopkins,
Nissen & Sprinkle Attys.

UNITED STATES PATENT OFFICE.

WILLIAM GRUS, JR., OF CHICAGO, ILLINOIS.

LEAF-SPRING LUBRICATOR.

1,121,354.

Specification of Letters Patent.

Patented Dec. 15, 1914.

Application filed August 8, 1913. Serial No. 783,774.

*To all whom it may concern:*

Be it known that I, WILLIAM GRUS, Jr., a citizen of the United States, residing at Chicago, in the county of Cook and State of Illinois, have invented certain new and useful Improvements in Leaf-Spring Lubricators, of which the following is a specification.

This invention relates to a device for introducing a lubricant between the leaves of a vehicle spring.

The invention consists in the features of novelty in the construction, combination and arrangement of the several parts generally shown in the accompanying drawing and described in the specification, but more particularly pointed out in the appended claims.

Figure 1:
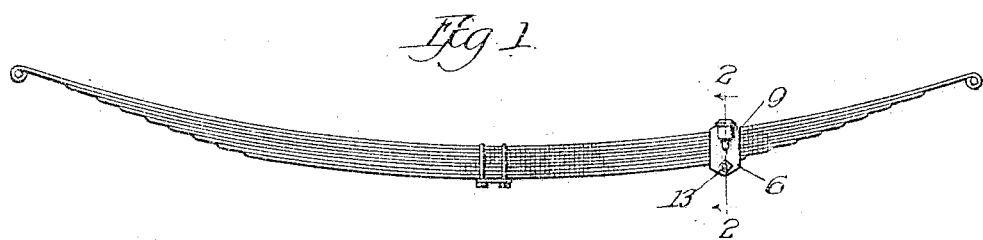
Figure 2:
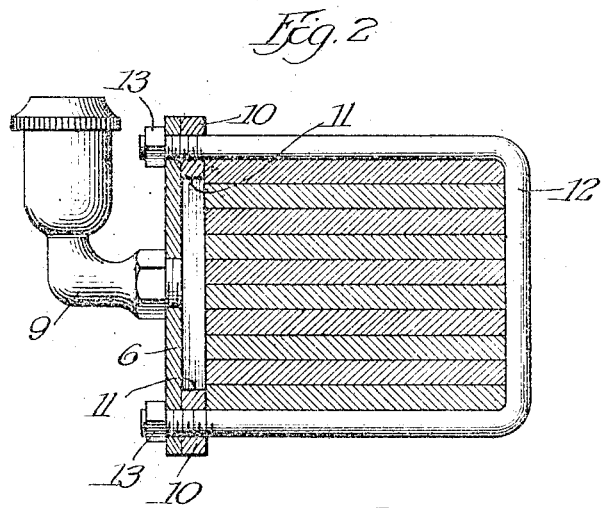
Figure 3:
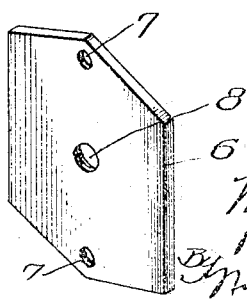

In the drawing, Figure 1 illustrates a leaf spring to which a device of the class described is attached; Fig. 2 is a sectional view of a portion of the device as applied to a spring, and Fig. 3 is a perspective view of the plate.

It is a well known fact that a vehicle spring consisting of a number of separate leaves is likely to become stiff in use if it is not lubricated, and particularly is this true of old springs or springs which have become rusted.

The present invention is for a device for introducing a lubricant between the leaves of such a spring which, by the movement of the spring itself, and by the movement of the separate leaves, causes the lubricant not only to be applied to the portion opposite the device, but also by the rubbing action of one leaf of the spring upon the other, to be distributed for a considerable distance on both sides of the device. By attaching adjacent the end of the lowermost leaf the lubricant is effectively distributed between the leaves. This device comprises a metal plate 6 having perforations 7 adjacent the ends and with an approximately central threaded perforation 8 to which an oil cup 9 of any suitable well known construction is attached. A member or washer 10 of pliant or yielding material, such as rubber or leather, having a central perforation 11 and openings corresponding to the openings 7 of the plate, is disposed on the side of the plate opposite to the oil cup. This device is then pressed against the side of a leaf spring so that the member 10 is pressed firmly against the edges of the separate leaves, forming a practically tight outer packing so that the lubricant from the oil cup 9 may be forced into the space formed by the perforation 11, and from there be introduced between the leaves of the spring for lubricating it.

In order to secure the device to a spring a U-shaped member 12 with threaded extremities is passed about the spring and the extremities are inserted through the perforation 7 in the plate and the corresponding perforation in the member 10. Nuts 13 are threaded on the ends of the member 12 to hold the device securely in position. The action of the spring itself permits the lubricant to be forced between the separate leaves and the sliding action of one spring upon the other spreads the lubricant along them. Since there is more sliding movement at the ends of the leaves than at the center, which is firmly held, the movement of the lubricant will be rather toward the ends than in the other direction and the lubricant will be distributed in the proper place to lubricate the springs. Besides making the springs work easier it will do away with the squeaking noises which they frequently emit.

What I claim is:

1. A device of the class described comprising a plate, a perforated piece of pliant material, the perforation of which communicates with surfaces to be lubricated, and an oil cup secured to the plate and communicating therethrough with the space formed by the perforation.

2. A device of the class described comprising a metal plate having a threaded perforation therein, a lubricating cup threaded in the perforation, a piece of pliant material having a central opening therethrough adapted to communicate with the perforation in the plate, and means to clamp the plate and the pliant material against the side of a leaf spring, the pliant material being interposed between the plate and the spring.

3. The combination with a spring having a plurality of leaves, of a plate having a central threaded perforation and perforations at the ends, a piece of flexible material formed with perforations registering with the end perforation of the plate and having a central perforation connecting with the central perforation of the plate, the central perforation of the flexible material being disposed over a number of the leaves of the spring at the side thereof, a lubricating cup threaded in the central perforation in the plate, a U-shaped member extending about the spring and having threaded extremities passing through the end openings in the flexible material and the said plate, and nuts adjustable on the threaded extremities to clamp the plate and flexible material firmly against the side of the spring.

4. A device of the class described, comprising a perforated metal plate, a lubricating cup connected thereto and communicating with the perforation, a piece of pliant material having a central opening adapted to communicate with the perforation in the plate, and means for clamping the plate and pliant material against the side of a leaf spring, the pliant material being interposed between the plate and the spring.

5. The combination with a spring having a plurality of leaves, of a perforated plate, a piece of flexible material formed with a perforation registering with the perforation of the plate, the perforation of the flexible material being disposed over a number of leaves of the spring at the side thereof, a lubricating cup connected to the plate and communicating with the perforation thereof, and a U-shaped member extending about the spring and securing the plate and flexible material to the spring, the flexible material being bound between the plate and spring.

6. A device of the class described comprising a perforated metal plate, a lubricating cup carried by the plate and communicating with the perforation thereof, a piece of pliant material having a central opening therethrough which communicates with the perforation in the plate, and means for clamping the plate and the pliant material against the side of a leaf spring, the pliant material being interposed between the plate and the spring.

7. The combination with a spring comprising a plurality of superimposed leaves, of means for confining a body of lubricant against a portion of the edges of the leaves.

8. The combination with a spring comprising a plurality of superimposed leaves, of a casing engaging the spring adapted to contain a lubricant and confine the same against a portion of the edges of the leaves of the spring.

In testimony whereof I have signed my name to this specification, in the presence of two subscribing witnesses, on this 6th day of August A. D. 1913.

WILLIAM GRUS, Jr.

Witnesses:
CHARLES H. SEEM,
KENT W. WONNELL.